US007647474B2

(12) United States Patent  
Bulusu et al.

(10) Patent No.: US 7,647,474 B2  
(45) Date of Patent: Jan. 12, 2010

(54) SAVING SYSTEM CONTEXT IN THE EVENT OF POWER LOSS

(75) Inventors: Mallik Bulusu, Olympia, WA (US); Vincent J. Zimmer, Federal Way, WA (US); Michael A. Rothman, Puyallup, WA (US)

(73) Assignee: Intel Corporation, Santa Clara, CA (US)

( * ) Notice: Subject to any disclaimer, the term of this patent is extended or adjusted under 35 U.S.C. 154(b) by 408 days.

(21) Appl. No.: 11/236,089

(22) Filed: Sep. 27, 2005

(65) Prior Publication Data

US 2007/0074053 A1 Mar. 29, 2007

(51) Int. Cl.  
*G06F 11/00* (2006.01)  
*G06F 1/30* (2006.01)

(52) U.S. Cl. .......................... 712/24; 714/22; 712/228
(58) Field of Classification Search ............ 714/22, 714/24; 712/228  
See application file for complete search history.

(56) References Cited

U.S. PATENT DOCUMENTS

| 4,458,307 | A | * | 7/1984 | McAnlis et al. ............... 714/22 |
| 4,907,150 | A | * | 3/1990 | Arroyo et al. ................ 713/323 |
| 5,117,324 | A | | 5/1992 | Johnson |
| 5,315,161 | A | * | 5/1994 | Robinson et al. .............. 307/66 |
| 5,386,552 | A | * | 1/1995 | Garney ........................ 714/10 |
| 5,822,600 | A | * | 10/1998 | Hallowell et al. ............ 713/340 |
| 5,828,823 | A | * | 10/1998 | Byers et al. ................... 714/24 |
| 6,105,138 | A | * | 8/2000 | Arakawa et al. ............. 713/300 |
| 6,170,066 | B1 | * | 1/2001 | See ............................. 714/22 |
| 6,209,088 | B1 | * | 3/2001 | Reneris ......................... 713/1 |
| 6,516,440 | B1 | * | 2/2003 | Teradaira .................... 714/763 |
| 6,629,248 | B1 | * | 9/2003 | Stachura et al. ............. 713/340 |
| 6,996,746 | B2 | * | 2/2006 | Shukla et al. ................. 714/24 |
| 7,028,220 | B2 | * | 4/2006 | Park ............................. 714/22 |
| 7,418,627 | B2 | * | 8/2008 | Baba ............................ 714/24 |
| 2004/0268166 | A1 | * | 12/2004 | Farkas et al. ................ 713/320 |

OTHER PUBLICATIONS

Wikipedia's NVRAM http://en.wikipedia.org/wiki/NVRAM retrieved Aug. 21, 2008.*  
A New Backup Power Supply with a Battery Deterioration Test Circuit by Takeno, Yamasaki and Muroyama published Nov. 1, 1995, Telecommuncations Energy Conference, 1995. INTELEC '95. ISBN: 0-7803-2750-0.*

(Continued)

*Primary Examiner*—Scott T Baderman  
*Assistant Examiner*—Joseph Schell  
(74) *Attorney, Agent, or Firm*—Blakely, Sokoloff, Taylor & Zafman LLP (57) ABSTRACT

Embodiments of a method and system for saving system context after a power outage are disclosed herein. A power agent operates to reduce the possibility of data corruption due to partially written data during an unexpected power outage. The power agent can determine an amount of time remaining before a power store is depleted. Based on the amount of time, the power agent can store system context information. Correspondingly, the power agent can operate to save complete system context, partial system context, or flush (I/O) buffers. Once power is restored, the power agent can restore the system context based on the nature of the save. Other embodiments are described and claimed.

14 Claims, 4 Drawing Sheets

OTHER PUBLICATIONS

PCT, International Application No. PCT/US2006/037762, International Preliminary Report on Patentability (Chapter I of the Patent Cooperation Treaty) mailed Apr. 10, 2008. Whole Document.

Invitation to Comply with EPC Requirements for EP Application No. 06 815 634.8-2224 mailed Jul. 18, 2008.

* cited by examiner

SAVING SYSTEM CONTEXT IN THE EVENT OF POWER LOSS

BACKGROUND OF THE DISCLOSURE

Unplanned power outages and interruptions can be disastrous to computer users. Frequent power disruptions can lead to equipment damage, such as hard disk corruptions, which can result in significant down time for a computer user. Significant down time in turn can lead to lost revenue and opportunity. Furthermore, power outages and interruptions can result in a loss of vital data associated with a computer. For example, unexpected power outages can result in data corruption due to data being partially written before the outage. Power outages can be particularly devastating for computer users in emerging markets in which power may be intermittent at best. Brown-outs continue to be problematic in India and China. Some business environments counter power outage issues by employing an uninterrupted power supply across a network. However, this option is not cost viable for many computer users.

DETAILED DESCRIPTION

A power agent can be associated with a platform, such as server, desktop, handheld device, and other computing devices. The power agent operates to reduce the possibility of data corruption due to partially written data during an unexpected power outage. The power agent can determine an amount of time (or power) remaining before a power store is depleted. Based on the amount of time, the power agent can store system context. In certain circumstances, the power agent operates to save partial system context which enables a partial restoration of the system environment once power is restored. The power agent operates to save system context to a storage device, such as non-volatile memory, based on an amount of power remaining in the power store. Accordingly, embodiments of a method and system for saving system context upon the occurrence of power outage are disclosed herein.

In the following description, numerous specific details are introduced to provide a thorough understanding of, and enabling description for, embodiments of operations using the power agent. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

Figure 1:
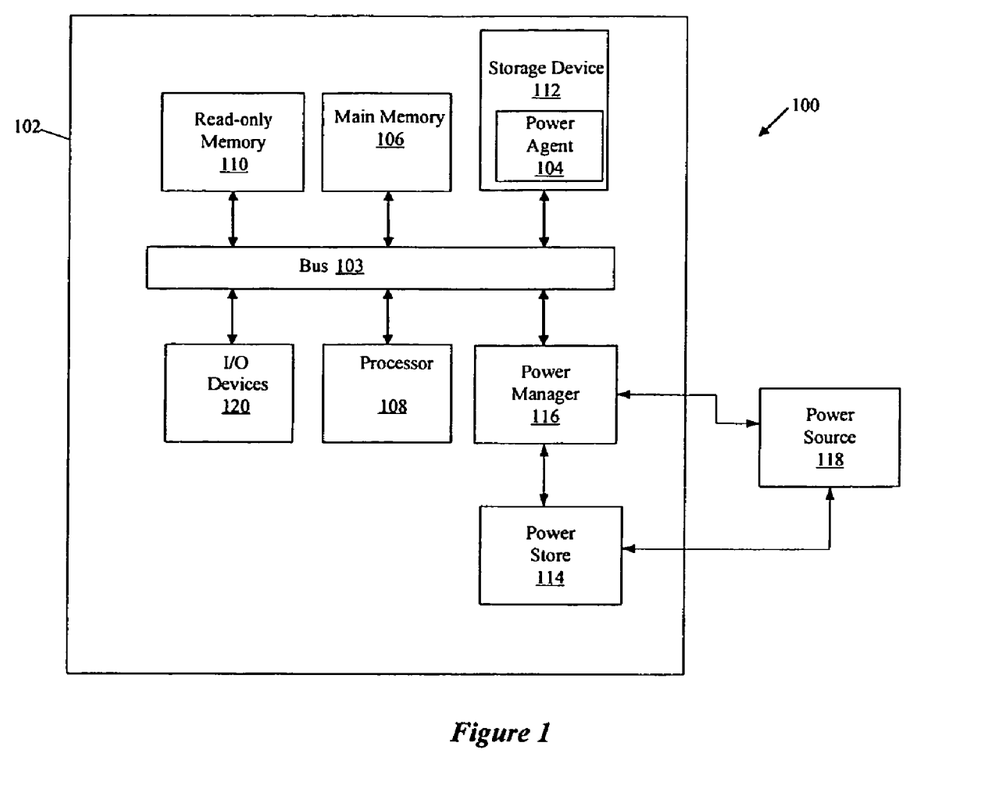
FIG. 1 is a block diagram of an operating environment including a power agent that operates to spool system context to non-volatile storage based on an amount of power remaining in a power store.
Figure 2:
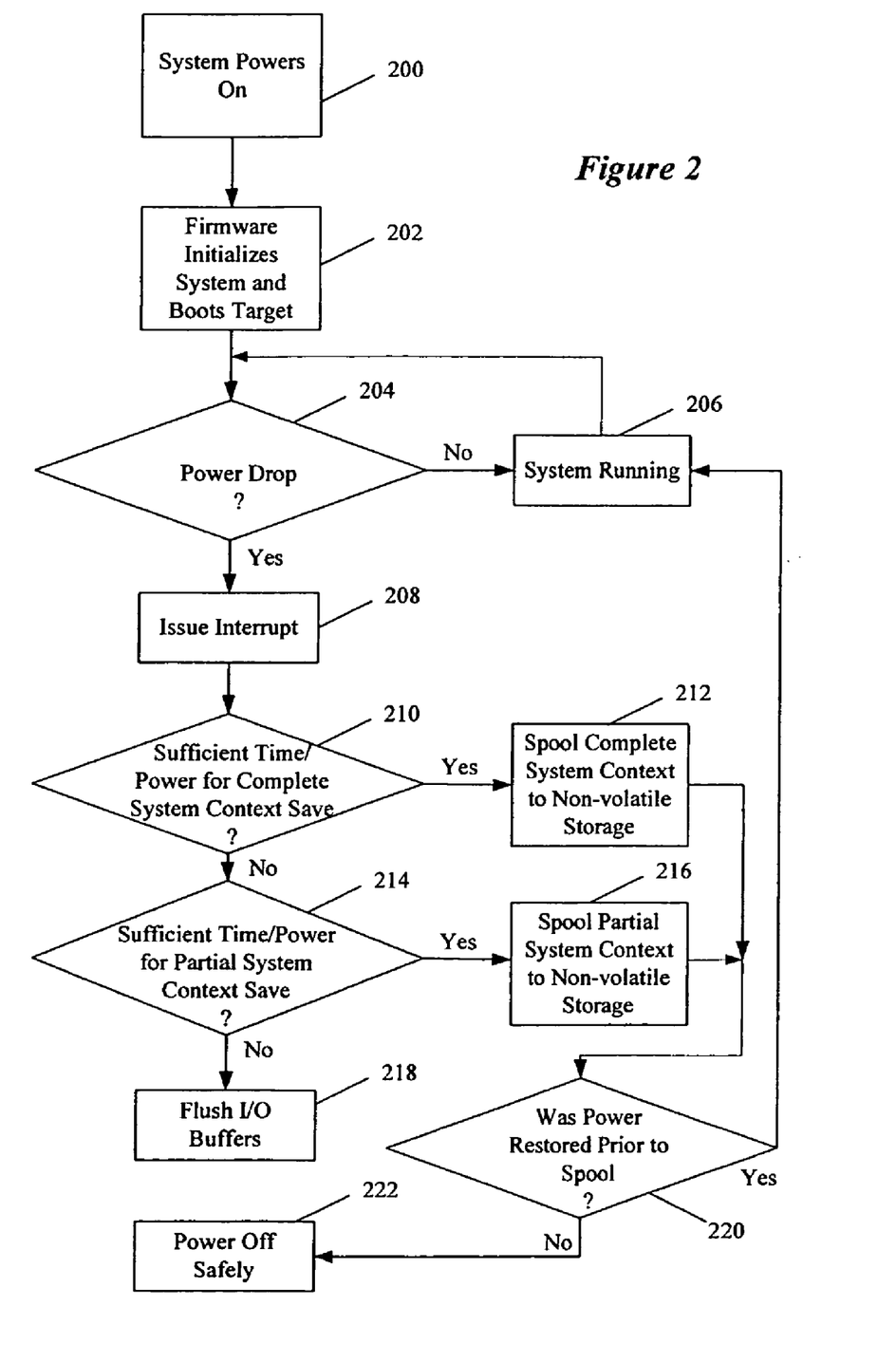
FIG. 2A is a flow diagram illustrating using a power agent to perform a system context save operation according to an embodiment.

FIG. 1 illustrates an operating environment 100 including a power agent 104 that operates to save system context to non-volatile storage, under embodiments described herein. A platform, computing device 102 for example, includes a bus 103 in communication with the power agent 104. As described further below, the power agent 104 is used in various transactions, such as transactions in which the computing device 102 has lost external power and requires saving system context to non-volatile storage. The computing device 102 is one type of a "platform." Generally, a platform corresponds to an entity, such as a server, mobile computing device, personal computer, etc. operating to transfer and manipulate information. The power agent 104 operation is described below in detail as represented by the flow of FIG. 2. The computing device 102 typically includes random access memory (RAM) or other dynamic storage as a main memory 106 for storing information and instructions to be executed by a processor 108. It will be appreciated that the computing device 102 can include multiple processors and other devices.

The computing device 102 can include read-only memory (ROM) 110 and/or other static storage for storing static information and instructions for the processor 108. A storage device 112, such as a magnetic disk, optical disk and drive, flash memory or other nonvolatile memory, or other memory device, can be coupled to the bus 103 of the computing device 102 for storing information and instructions. The power agent 104 is configured as logic embedded in the storage device 112, such as a flash memory component. The embedded logic can be hardware, software, or a combination of both. As described below, the power agent 104 operates to save system context to a non-volatile memory, such as storage device 112, based on an amount of power contained in a power store 114.

As shown in FIG. 1, according to an embodiment, the power agent 104 is in communication with a power store 114, power manager 116, and power source 118. According to this embodiment, the power store 114 is implemented as a capacitive device which operates to store power or energy based on the storage capacity and time connected to an active power or energy source, such as power source 118. Alternatively, the power store 114 is implemented as a quick discharge battery, such as a nickel metal hydride ("NiMH") battery, lithium ion battery, bank of capacitors, uninterruptible power supply, etc. Once the power source 118 is shut-off or otherwise interrupted (such as during a power outage), the power store 114 operates to dissipate the stored energy at a rate which is dependent on its storage capacity and load.

As described below, the power store 114 has sufficient capacity to allow the power agent 104 to save some or all of the system context when the external power source 118 is interrupted or fails. It will be appreciated that the power store 114 is implemented to have sufficient capacity based on the components and configuration of an associated computing device. For example, the capacity of the power store 114 is typically less for smaller systems, such as handheld devices, as compared to larger systems, such as desktop systems. The power source 118 is an A/C power supply or equivalent, such as a wall outlet which can supply power to the computing device 102 when the computing device 102 is plugged in.

A number of input/output (I/O) devices 120 can be coupled with the computing device 102 via bus 103. Exemplary (I/O) devices include, but are not limited to, display devices, communication devices, audio devices, printers, scanners, and various manipulation devices for inputting and outputting information to a platform. The computing device 102 can be in communication with a network, system, or other computing devices.

As described above, the power agent 104 is also in communication with a power manager 116. The power manager 116 is a power or voltage sensor operating to monitor the power source 118. The power manager 116 also operates to monitor the power store 114 to determine an amount of power available at a given time. The power manager 116 can also be described as a power management microcontroller which operates to monitor the charge level of the power source 118 and power store 114, respectively.

As described below, if the power manager 116 detects a drop in the charge level of the power source 118, the power manager 116 is configured to interrupt the processor 108 by providing an interrupt signal across the bus 103 to the processor 108. According to an embodiment, the power manager 116 can interrupt the main processor at any time via a system management interrupt (SMI). The SMI can be used when the power manager 116 detects a drop in the charge level of the power source 118. The SMI is a high priority non-maskable interrupt for the processor 108. According to an embodiment, the power manager 116 operates to filter the signal from the power source 118, which can smooth out intermittent power surges. The power manager 116 filtering will allow for a more consistent user experience, while also tending to prevent damage to the system.

FIG. 2 is a flow diagram illustrating a system context save operation according to an embodiment. At 200, a system, such as computing device 102 powers on by switching on the computing device 102. At this point, the power source 118 is providing power to the computing device 102. The power source 118 is also supplying power to the power store 114. Accordingly, the power store 114 begins to charge or store power. At 202, the firmware initializes the computing device 102 and boots a target application, such as an operating system (OS) target. Firmware typically refers to software stored in ROM or programmable ROM (PROM) and is responsible for the behavior of the computing device 102 when it is first switched on. During initialization, firmware logic, including the agent 104, is loaded from the storage device 112 to handle interactions, such as various errors or conditions detected by hardware of the computing device 102, as described below.

As described above, the power manager 116 monitors the charge level of the power source 118. At 204, the power manager 116 detects whether a drop in charge level of the power source 118 has occurred. If the power manager 116 does not detect a drop in charge level of the power source 118, at 206, the computing device 102 continues its normal operation. If the power manager 116 detects a drop in charge level of the power source 118, at 208, the power manager 116 issues an interrupt, such as an SMI, which alerts the processor 108 of the power loss. At this point, the power store 114 begins to discharge its stored charge.

As described above, the power agent 104 is in communication with the power manager 116 and the power store 114. According to this embodiment, the computing system 102 gives control to the power agent 104 based on the interrupt. The power agent 104 also receives information from the power manager 116 associated with the remaining charge level in the power store 114. At 210, based on the configuration of the computing device 102, the power agent 104 determines if there is sufficient charge (power) remaining in the power store 114 to perform a complete system context save, such as an Advanced Configuration and Power Interface (ACPI) S4 state save.

Based on the charge remaining in the power store 114, the power agent 104 determines an amount of time (or power) remaining before the charge is totally depleted. The time remaining is dependent on the capacity of the power store 114 and the configuration of the computing system 102. The time remaining can be correlated to how long it will take to spool the system context to memory. Alternatively, the power manager 116 can be configured to calculate the amount of time (or power) remaining, and provide this information to the power agent 104. If there is sufficient charge remaining in the power store 114 to perform a complete system context save, at 212, the power agent 104 spools the complete system context to non-volatile storage. The complete context save allows a complete restoration of the system environment when power is restored to the computing device 102. If there is insufficient charge remaining in the power store 114 to perform a complete system context save, at 214, the power agent 104 determines if there is sufficient charge remaining in the power store 114 to perform a partial system context save.

If there is sufficient charge remaining in the power store 114 to perform a partial system context save, at 216, the power agent 104 spools the partial system context to non-volatile storage. According to this embodiment, spooling partial system context corresponds with saving the active OS state (non-paged) and context for one or more applications currently in use by the user of the computing device 102. Thus, during the partial context spool, the power agent 104 saves the active non-paged OS state and the context of one or more applications currently in use based on the amount of charge remaining in the power store 114 (which corresponds to a spool time) and/or a prioritized application spooling scheme. For this embodiment, applications being used at the time of power drop-off are prioritized. The partial context save allows a partial restoration of the system environment when power is restored to the computing device 102.

If there is insufficient charge remaining in the power store 114 to perform a partial system context save, at 218, the power agent 104 flushes the input/output (I/O) buffers, ensuring that there is no partially written data remaining. According to this embodiment, at 220, if power is restored to the computing device before completion of a spool to storage 102 (at 212 or 216), the power agent 104 discontinues the respective spool and the flow returns to 206. Otherwise, the computing device 102 safely powers off at 222.

Figure 3A:
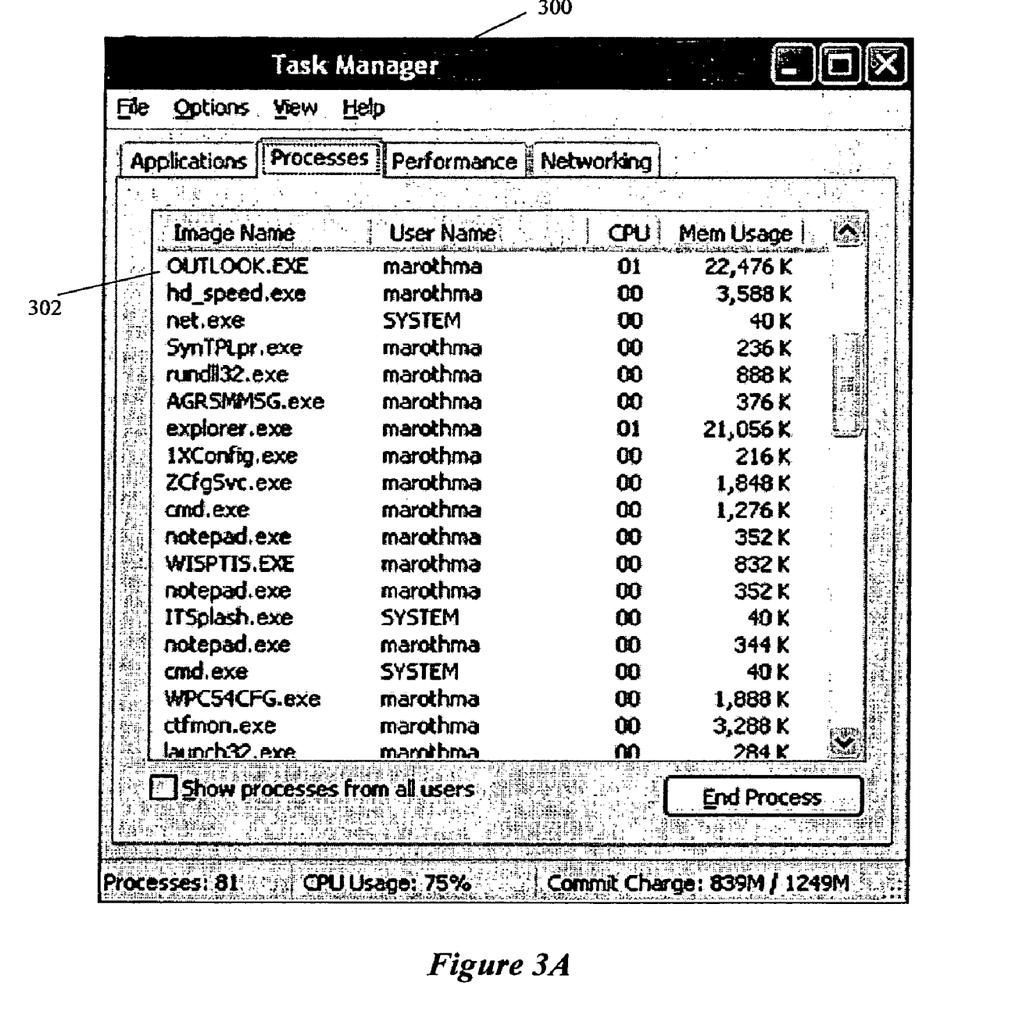
FIG. 3A is a screen shot of an operating system task manager illustrating a number of processes of a computing device.

FIG. 3A is a screen shot of an OS task manager 300 which illustrates a number of processes running on a computing device. As shown in FIG. 2, the user is running a number of processes, and is currently using an e-mail application ("OUTLOOK.EXE") 302. The e-mail application 302 is using 22.476 Mbytes of memory.

Figure 3B:
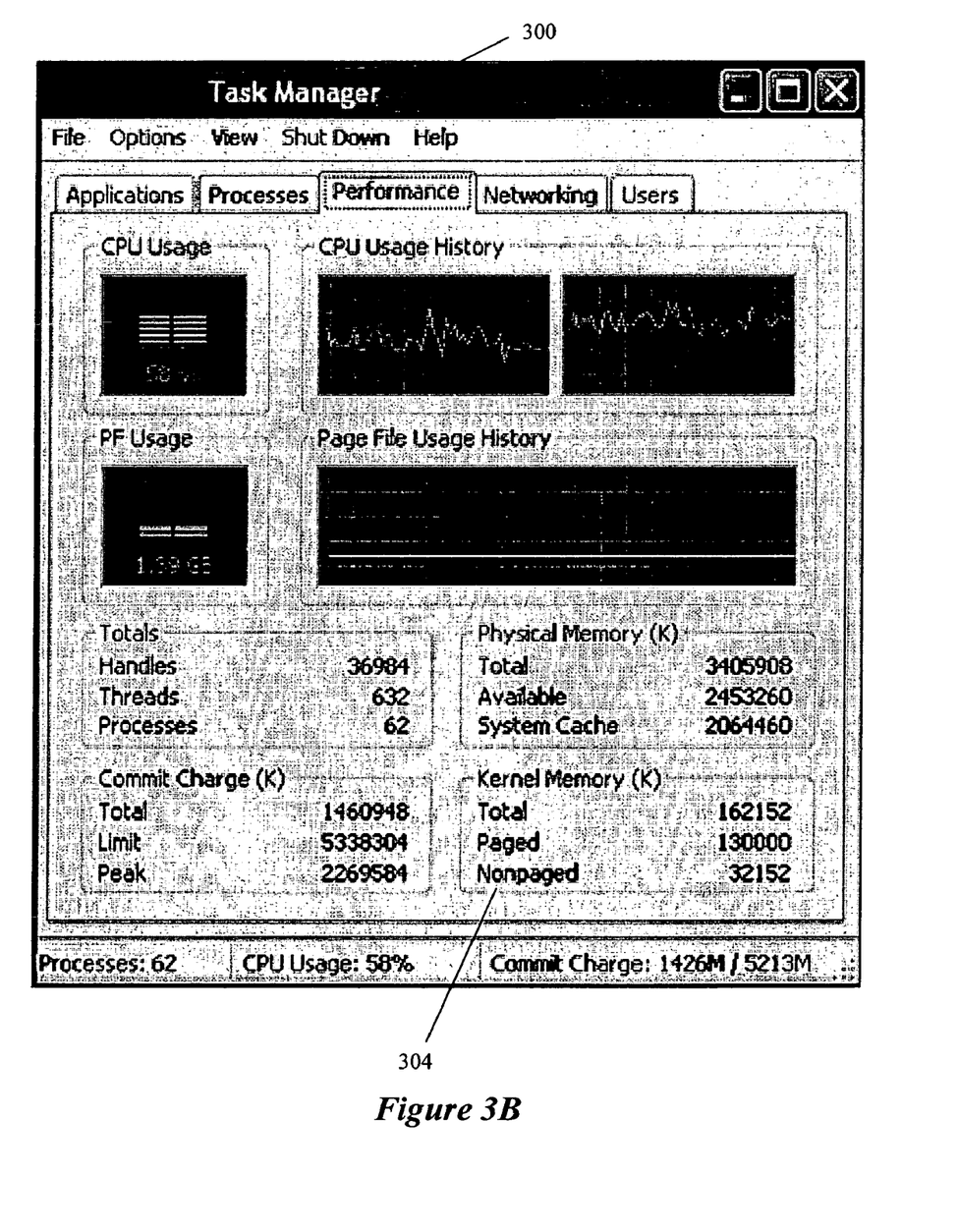
FIG. 3B is a screen shot of an operating system task manager illustrating performance related information associated with the computing device of FIG. 3A.

FIG. 3B is a screen shot of the OS task manager 300 illustrating performance related information associated with the computing device running the processes in FIG. 3A. As shown in FIG. 3B, the active non-paged OS state 304 is using 32.152 Mbytes of memory. According to this example, it would take about 150 seconds to spool the complete system context if power was lost or interrupted. Conversely, it would take about 3.4 seconds to spool the partial system context which includes the non-paged OS state and the e-mail application context. (i.e. (32.1 Mbytes+22.5 Mbytes)/16 Mbytes/sec=3.4 seconds).

Consequently, for this example, the power store 114 only has to provide power for 3.4 seconds to enable the power agent 104 to perform a partial system context save, as compared to 150 seconds for a complete system context save. Thus, to perform a partial system context save, the power store 114 should have sufficient capacity to provide enough time for the power agent 104 to spool the non-paged OS state and the e-mail application context. Accordingly, the time to perform a partial system context save is about 2 orders of magnitude less than for a complete context system save. This time difference can be critical if and when the power source 118 is interrupted or lost. Moreover, the power store 114 does not have to have a size and related cost to allow time to spool the complete system context and can be implemented in a computing system to be consistent with partial context saving capability. Finally, if the power store 114 does not have sufficient charge, the power agent 104 can at least flush the I/O buffers, as described above. It will be appreciated that the power store 114 can include more or less capacity, and the amount of time the capacity will run the computing device is dependent upon the configuration and user preferences when using the computing device 102.

In an alternative embodiment, the power store 114 and power manager 116 can be consolidated as a separate device. The consolidated power store 114 and power manager 116 can then be coupled between the computing device 102 and power source 118. Alternatively, the power store 114 and power manager 116 can be separately coupled between the power source 118 and computing device 102. It will be appreciated that different configurations can be used according to a desired implementation.

It will also be appreciated that the power agent 104 can be included separately from the OS (OS agnostic), as described above. Alternatively, the power agent 104 is embedded with the OS and operates to trigger an OS specific driver if power is lost or interrupted. In any case, the embodiments described herein tend to reduce the possibility of data corruption due to partially written data during an unexpected power outage.

Aspects of the methods and systems described herein may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Embodiments may also be implemented as microcontrollers with memory (such as electrically erasable programmable read-only memory ("EEPROM")), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, etc.

The various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., hypertext transfer protocol ("HTTP"), file transfer protocol ("FTP"), simple mail transfer protocol ("SMTP"), etc.).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list; all of the items in the list; and any combination of the items in the list.

The above description of illustrated embodiments is not intended to be exhaustive or limited by the disclosure. While specific embodiments of, and examples are described herein for illustrative purposes, various equivalent modifications are possible, as those skilled in the relevant art will recognize. The teachings provided herein can be applied to other systems and methods, and not only for the systems and methods described above. The elements and acts of the various embodiments described above can be combined to provide further embodiments. These and other changes can be made to methods and systems in light of the above detailed description.

In general, in the following claims, the terms used should not be construed to be limited to the specific embodiments disclosed in the specification and the claims, but should be construed to include all systems and methods that operate under the claims. Accordingly, the method and systems are not limited by the disclosure, but instead the scope is to be determined entirely by the claims. While certain aspects are presented below in certain claim forms, the inventors contemplate the various aspects in any number of claim forms. For example, while only one aspect is recited as embodied in a machine-readable medium, other aspects may likewise be embodied in a machine-readable medium. Accordingly, the inventors reserve the right to add additional claims after filing the application to pursue such additional claim forms for other aspects as well.

What is claimed is:

1. A method comprising:
    receiving an interrupt based on a power failure in a computing device having a physical memory and an associated depletable power store powered by a power source subject to unpredictable failure, wherein the power failure is detected by a drop in the power level of the associated power store;
    determining an amount of time remaining before computing device power is lost, based on the power level of the associated depletable power store;
    determining the amount of physical memory used by a complete system context, the complete system context to include the context of all applications in use;
    determining if the amount of time remaining is sufficient to save the complete system context to non-volatile memory that retains saved information without power; and
    saving the complete system context to the non-volatile memory if the amount of time remaining is sufficient; otherwise
    saving a partial system context to the non-volatile memory, wherein the partial system context includes a context of at least one application in use.

2. The method of claim 1, further comprising flushing input/output (I/O) buffers if the amount of time is insufficient to spool the partial system context.

3. The method of claim 1, further comprising using an agent to determine the amount of time based at least in part on an amount of charge remaining in the power store.

4. The method of claim 1, further comprising completely restoring the system context when power is restored after a power loss.

5. The method of claim 1, further comprising partially restoring the system context when power is restored after a power loss.

6. A computer-executable program tangibly embodied on a computer-readable storage medium that, when executed by a computer, causes the computer to save system context to non-volatile memory by:

receiving an interrupt based on a power failure in a computing device having a physical memory and an associated depletable power store powered by a power source subject to unpredictable failure, wherein the power failure is detected by a drop in the power level of the associated power store;

determining the amount of physical memory used by a complete system context, the complete system context to include the context of all applications in use;

determining an amount of time remaining before computing device power is lost, based on the power level of the associated depletable power store;

determining that the amount of time remaining is sufficient to spool the complete system context to non-volatile memory that retains saved information without power; and spooling the complete system context to the non-volatile memory if the amount of time remaining is sufficient; otherwise spooling a partial system context to the non-volatile memory, wherein a partial system context includes a context of at least one application in use.

7. The tangibly embodied computer-executable program of claim 6, wherein the program, when executed, flushes an input/output (I/O) buffer if the amount of power is insufficient to spool the partial system context.

8. The tangibly embodied computer-executable program of claim 6, wherein the program, when executed, uses a power agent to determine the amount of time remaining based at least in part on an amount of charge remaining in the power store.

9. The tangibly embodied computer-executable program of claim 6, wherein the program, when executed, uses a power manager to monitor a power supply and the power store.

10. A system configured to save a system context to non-volatile memory, the system comprising:

a physical memory; and a power agent included in the non-volatile memory configured to:

receive an interrupt based on a power failure in a computing device having an associated depletable power store powered by a power source subject to unpredictable failure, wherein the power failure is detected by a drop in the power level of the associated power store;

determine the amount of physical memory used by a complete system context, the complete system context to include the context of all applications in use;

determine an amount of time remaining before computing device power is lost, based on the power level of the associated depletable power store;

determine if the amount of time is sufficient to spool the complete system context to non-volatile memory that retains saved information without power; and spool the complete system context to the non-volatile memory if the amount of time remaining is sufficient; otherwise spool a partial system context to the non-volatile memory, wherein a partial system context includes a context of at least one application in use.

11. The system of claim 10, wherein the power agent is further configured to flush an input/output (I/O) buffer if the amount of time is insufficient to spool the partial system context.

12. The system of claim 10, wherein the power agent is further configured to determine the amount of time based at least in part on an amount of charge remaining in the power store.

13. The system of claim 10, wherein the power agent is further configured to completely restore the system context when power is restored.

14. The system of claim 10, wherein the power agent is further configured to partially restore the system context when power is restored.

* * * * *

UNITED STATES PATENT AND TRADEMARK OFFICE
CERTIFICATE OF CORRECTION

PATENT NO. : 7,647,474 B2 Page 1 of 1
APPLICATION NO. : 11/236089
DATED : January 12, 2010
INVENTOR(S) : Bulusu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 444 days.

Signed and Sealed this

Twenty-eighth Day of December, 2010

David J. Kappos
*Director of the United States Patent and Trademark Office*